United States Patent Office 3,704,259
Patented Nov. 28, 1972

3,704,259
TRIS(BICYCLOHEPTYL)CHROMIUM
Barton K. Bower, Newark, Del., assignor to Hercules Incorporated, Wilmington, Del.
No Drawing. Filed Feb. 2, 1971, Ser. No. 112,015
Int. Cl. C07f 11/00
U.S. Cl. 260—438.5 R                    2 Claims

ABSTRACT OF THE DISCLOSURE

Organo trivalent chromium compounds are described wherein the chromium is linked to the bridgehead carbons of three bicyclic radicals, namely a 1-bicyclo-[2·2·1]-heptyl radical that contains two methyl groups attached to carbons adjacent to the bridgehead carbon, i.e., in the 2 and/or 6 position. A typical compound is tris(4-camphyl) chromium. These compounds are useful as catalysts for the polymerization of 1-olefins and can be used alone or in combination with organometallic activators such as alkylaluminum compounds.

---

This invention relates to a new class of organochromium compounds and more particularly to trivalent compounds of chromium wherein the metal is attached to the bridgehead carbon of certain bicyclic hydrocarbon radicals and to their use as catalysts for the polymerization of olefins.

Many organochromium compounds are known, but for the most part these are complexes such as the metal carbonyls or they are the so-called sandwich compounds in which the organo groups are bound to the metal as planar systems, as, for example, the π-allyl compounds, the bis(arene) compounds and compounds such as chromocene.

Now in accordance with this invention a unique group of organo-trivalent chromium compounds has been discovered wherein the metal is bound to the bridgehead carbons of three bicyclic hydrocarbon radicals. These compounds have the formula Y₃Cr where Y is a 1-bicyclo-[2·2·1]-heptyl radical containing two methyl groups attached to carbons adjacent to the bridgehead carbon, i.e., in the 2 and/or 6 position. Thus the compounds of this invention will have the formula

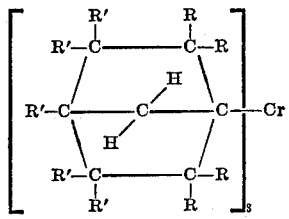

where 2 of the R's are CH₃ and the remainder are H and each of the R's is H or CH₃, the total number of CH₃ groups attached to the bicyclic radical being 2 to 4.

Exemplary of these tris(polymethyl-1-bicyclo-[2·2·1]-heptyl) chromium compounds are those wherein the radical attached to the chromium is 2,2-dimethyl-1-bicyclo-[2·2·1]-heptyl
2,6-dimethyl-1-bicyclo[2·2·1]-heptyl
2,2,3-trimethyl-1-bicyclo-[2·2·1]-heptyl
2,2,4-trimethyl-1-bicyclo-[2·2·1]-heptyl
2,2,5-trimethyl-1-bicyclo-[2·2·1]-heptyl
2,3,6-trimethyl-1-bicyclo-[2·2·1]-heptyl
2,4,6-trimethyl-1-bicyclo-[2·2·1]-heptyl
2,2,3,5-tetramethyl-1-bicyclo-[2·2·1]-heptyl
2,2,3,4-tetramethyl-1-bicyclo-[2·2·1]-heptyl
2,3,3,6-tetramethyl-1-bicyclo-[2·2·1]-heptyl
2,3,4,6-tetramethyl-1-bicyclo-[2·2·1]-heptyl
2,3,5,6-tetramethyl-1-bicyclo-[2·2·1]-heptyl The bridgehead tris(bicyclo)chromium compounds of this invention can be prepared by the reaction of the corresponding bridgehead lithium compound with a chromium halide. In many cases it is advantageous to use an ether complex of the metal salt. The bridgehead lithium compound is as described in the literature, generally prepared by reaction of a bridgehead halide with metallic lithium. Bridgehead lithium compounds that can be so prepared and used to prepare the organometallic compounds of this invention are 2,2-dimethyl-1-bicyclo-[2·2·1]-heptyllithium; 2,6 - dimethyl-1-bicyclo-[2·2·1]-heptyllithium; 2,2,3 - trimethyl-1-bicyclo-[2·2·1]-heptyllithium which may also be named 4-camphyllithium, 2,3,5,6-tetramethyl-1-bicyclo-[2·2·1]-heptyllithium; etc. Exemplary of the chromium salts that can be reacted to produce the compounds of this invention are chromium trichloride, chromium trichloride tetrahydrofuranate (CrCl₃·3THF)

chromium trifluoride, chromium triiodide, etc.

The reaction between the bridgehead lithium compound and the chromium salt can be carried out in a saturated hydrocarbon diluent such as pentane, heptane, cyclohexane, etc. The temperature at which the reaction is carried out can be varied widely but generally will be within the range of from about −78° C. to 35° C.

The tris-(polymethyl-1-bicyclo-[2·2·1]-heptyl) chromium compounds of this invention have outstanding utility as catalysts for the polymerization of 1-olefins. They are effective as the sole catalyst for the polymerization or they can be used in combination with an activator. The polymerization can be carried out as a solution or slurry process or the catalyst can be deposited on a solid support such as silica, the chromium compound, in the presence of the 1-olefin, immediately reacting with the silica to produce an exceptionally active catalyst. Thus the tris(polymethyl)-1-bicyclo-[2·2·1]-heptyl) chromium compounds provide an outstanding means for the polymerization of olefins.

Any 1-olefin can be polymerized with the new catalysts of this invention, as, for example, ethylene, propylene, butene-1, etc. As already stated, the polymerization can be carried out in solution or slurry, i.e., by passing the olefin through a solution of the chromium compound or by passing the gaseous 1-olefin over the chromium compound that has been deposited on a solid support. Any inert diluent can be used for carrying out the polymerization in solution, and in particular hydrocarbons that are free of ethylenic unsaturation, as, for example, aliphatic hydrocarbons such as pentane, hexane, heptane, octane, etc., cycloaliphatic hydrocarbons such as cyclohexane, or aromatic hydrocarbons such as benzene, toluene, etc.

The chromium compounds can be extended on any oxidic carrier material as, for example, any silica, alumina, thoria, titania, etc., particulate material as well as the mixed alumino-silicates, etc. The carrier can be impregnated and/or reacted with the tris-(bicycloheptyl) chromium compound in a variety of ways. Preferably, a hydrocarbon solution of the chromium compound is mixed with the oxidic material and reacted in the presence of a small amount of the 1-olefin, whereupon the chromium compound reacts almost immediately. The amount of the chromium compound extended on the solid support can be varied as desired but generally will be from about 0.005 to about 0.5 millimole per gram of the carrier.

In some cases, the chromium compound can be used as the catalyst without any activator. However, yields and rates of polymerization are generally enhanced by using a combination of the tris(bicycloheptyl)chromium compound and an activator. Again, because of the versatility of these catalysts, a wide variety of activators can be used. Visible and/or ultraviolet light can be used as the activator or an organometallic compound can be used as the activator or a combination of the two can be used. Exemplary of the activators that can be used are mercury and zinc dihydrocarbon compounds, boron trihydrocarbons, organoaluminum compounds, and lead, tin or germanium tetrahydrocarbon compounds. Thus, any compound having the formula $MR_n$, where M is Hg, Zn, B, Al, Pb, Sn or Ge, R is a hydrocarbon radical free of ethylenic unsaturation and $n$ is the valence of M, can be used. Examples of these compounds are those where the R's are alike or different and can be alkyl, cycloalkyl, alkylcycloalkykl, aryl, aralkyl and alkaryl such as methyl, ethyl, propyl, n-butyl, tert.-butyl, cyclohexyl, phenyl, benzyl, tolyl, etc. In addition, aluminum compounds having the formula

where R is an alkyl, alkenyl, cycloalkyl, aryl, aralkyl, alkaryl, etc. group and X and Y are R (which can be the same or different), halide, H, alkoxide, etc. can be used. Of particular importance are the alkylaluminum dihalides or trialkylaluminum compounds. Exemplary of the organoaluminum compounds that can be used are trimethylaluminum, triethylaluminum, tri(n-butyl)aluminum, triisobutylaluminum, ethylaluminum dichloride, methylaluminum sesquichloride, ethylaluminum sesquichloride, diisobutylaluminum hydride, trihexylaluminum, trioctylaluminum, tridodecylaluminum, aluminum isoprenyl, triphenylaluminum, tribenzylaluminum, tri(cyclohexyl)aluminum, etc. When an organometallic activator is used it generally will be used in an amount such that the molar ratio of it to the chromium compound will be within the ratio of from about 0.5:1 to 100:1 and preferably from about 1:1 to about 10:1.

The temperature at which the polymerization is carried out will depend upon the type of process used, but generally will be within the range of from about 0° C. to about 120° C., although higher or lower temperatures can be used. Because of the high activity of these catalysts, the polymerization is generally carried out at relatively low temperatures, such as from about 10° to about 50° C. Any pressure, from subatmospheric to as high as 30 atmospheres or more can be used. Any amount of the chromium compound can be used to catalyze the polymerization from a minor catalytic amount to a large excess, if desired.

The following examples will illustrate the preparation of the tris(bicyclo)chromium compounds of this invention and their use as catalysts for the polymerization of 1-olefins.

EXAMPLE 1

Preparation of 4-camphyllithium

To 3.8 g. of lithium powder in 21 ml. of hexane refluxing in an argon atmosphere were added over 7 hours 18.0 g. of 1 - chloro-2,2,3-trimethylbicyclo[2·2·1] heptane, and the reaction, mixture was heated at reflux for 19 hours. 1 - (2,2,3 - trimethylbicyclo[2·2·1]-heptyl) lithium was isolated by centrifuging to remove the lithium chloride and unreacted lithium and then removing the hexane under vacuum. The 12.9 g. of product obtained contained $6.22 \times 10^{-3}$ moles of the 4-camphyllithium per gram of product.

Preparation of tris(4-camphyl) chromium

To a mixture of 1.31 g. of tris-tetrahydrofuran chromium trichloride in 25 ml. of pentane at −78° C. was added 1.71 g. of the above product. The reaction mixture was then allowed to warm to room temperature and was stirred at that temperature for 2 weeks. The reaction mixture was centrifuged and the pentane solution decanted. The insoluble residue was washed three times with 50 ml. of pentane. The pentane solution and washings were combined and the pentane was removed under vacuum. The crude product was then recrystallized from pentane. The dark green solid so obtained amounted to a yield of 39% based on the 4-camphyllithium used. Analysis showed the compound to contain: lithium, 0.047%; chlorine, 0.17%; carbon, 76.86%; and hydrogen, 11.01%. The theoretical values for $(C_{10}H_{17})_3$ Cr are 0, 0, 77.68 and 11.08 respectively. The electron spin resonance spectrum showed the chromium to be trivalent with three identical groups attached to it.

EXAMPLE 2

A 340 ml. polymerization vessel filled with argon was charged with 50 ml. of n-heptane and $1.0 \times 10^{-5}$ mole of the above-prepared tris(4-camphyl)chromium. The vessel was pressured with ethylene to 30 p.s.i.g. at a temperature of 55° C. The polymerization was terminated after 17 hours. The reactor was vented and cooled and the polymer was recovered by evaporation of the heptane. The polyethylene so produced amounted to 40 g. per millimole of chromium and the rate was 1.2 g./mmole Cr/atm./hr.

EXAMPLE 3

The process of Example 2 was repeated except that there initially was also charged $1.0 \times 10^{-5}$ mole of ethylaluminum dichloride and the polymerization was terminated after 2.6 hours. The yield of polyethylene so produced was 11 g./mmole of chromium at a rate of 2.0 g./mmole Cr/atm./hr.

EXAMPLE 4

Example 3 was duplicated except that triethylaluminum was used in place of the ethylaluminum dichloride used in that example. The yield of polyethylene was 50 g./mmole of chromium at a rate of 9.6 g./mmole Cr/atm./hr.

EXAMPLE 5

Example 2 was repeated except that the reaction temperature was 25° C. and the contents of the vessel were irradiated with visible light by exposure to a 275 watt sunlamp placed about 12 inches from the glass vessel. The reaction was terminated after 1.9 hours. The yield of polyethylene was 19 g. per millimole of chromium at a rate of 5.9 g./mmole Cr/atm./hr.

EXAMPLE 6

A sample of commercial pyrogenic silica was dried at 30° C. for 16 hours. A polymerization vessel filled with argon was charged with 0.40 g. of this silica and 50 ml. of heptane. The argon was flushed out with ethylene to leave 1.0 atm. of ethylene. With the vessel and contents at 20° C., $1 \times 10^{-5}$ mole of tris(4-camphyl)chromium in heptane solution was injected. The chromium compound reacted with the silica in less than 2 minutes and polymer began to appear. The temperature was raised to 50° C. and the ethylene pressure to 30 p.s.i.g. The polymerizaiton was terminated after 1.9 hours. The yield of polyethylene was 430 g. per millimole of chromium at a rate of 75 g./mmole Cr/atm./hr.

EXAMPLE 7

A 340 ml. polymerization vessel filled with argon was charged with 50 ml. of n-heptane and 0.40 g. of a microspheroidal silica gel that had been dried at 300° C. under a stream of oxygen for 16 hours. The vessel was sparged with propylene to remove the argon and then was pressured with propylene to 30 p.s.i.g. With the temperature at 10° C., $1.0 \times 10^{-5}$ mole of tris(4-camphyl)chromium was added. The color was discharged from the solution in less than 1 minute and the silica became dark red-brown.

After 30 minutes, $2.0 \times 10^{-5}$ mole of triethylboron was added and the temperature was raised to 40° C. The polymerization was terminated after 2.0 hours. The yield of polypropylene so produced was 24 g. per millimole of chromium at a rate of about 4 g./mmole Cr/atm./hr.

What I claim and desire to protect by Letters Patent is:

1. An organochromium compound having the formula $Y_3Cr$, where Y is the bicyclic radical

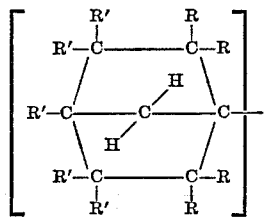

where two of the R's are $CH_3$ and the other R's and H and each of the R's is H or $CH_3$, and the total number of $CH_3$ groups attached to the bicyclic radical is 2 to 4.

2. Tris(4-camphyl)chromium.

References Cited

UNITED STATES PATENTS 3,152,157  10/1964  Shapiro _____ 260—438.5 R

OTHER REFERENCES

Chemical Abstracts, vol. 70, 96898t (1969).
Chemical Abstracts, vol. 70, 106630r (1969).
Chemical Abstracts, vol. 57, 11221d (1962).

JAMES F. POER, Primary Examiner

H. M. S. SNEED, Assistant Examiner

U.S. Cl. X.R.

252—428, 431 R; 260—94.9 B

PO-1050
(5/69)

UNITED STATES PATENT OFFICE
CERTIFICATE OF CORRECTION

Patent No. 3,704,259      Dated November 28, 1972

Inventor(s) Barton K. Bower    (Case 2)

It is certified that error appears in the above-identified patent and that said Letters Patent are hereby corrected as shown below:

Column 4, line 53, "30°C." should read --300°C.--

Signed and sealed this 24th day of April 1973.

(SEAL)
Attest:

EDWARD M. FLETCHER, JR.
Attesting Officer

ROBERT GOTTSCHALK
Commissioner of Patents